US012363029B2

(12) United States Patent
Movva et al.

(10) Patent No.: US 12,363,029 B2
(45) Date of Patent: Jul. 15, 2025

(54) SYSTEMS AND METHODS FOR CONTEXTUAL MESSAGING AND INFORMATION ROUTING IN A DISTRIBUTED LEDGER NETWORK

(71) Applicant: JPMORGAN CHASE BANK, N.A., New York, NY (US)

(72) Inventors: Tulasi Movva, Trumbull, CT (US); Alexander Littleton, Chicago, IL (US); Hannah Dorfman, Brooklyn, NY (US); Palka S. Patel, Jersey City, NJ (US); Robert Franklin Gossett, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 10 days.

(21) Appl. No.: 17/811,243

(22) Filed: Jul. 7, 2022

(65) Prior Publication Data
US 2023/0012065 A1    Jan. 12, 2023

Related U.S. Application Data

(60) Provisional application No. 63/219,299, filed on Jul. 7, 2021.

(51) Int. Cl.
*H04L 9/00* (2022.01)
*H04L 45/00* (2022.01)
(Continued)

(52) U.S. Cl.
CPC ............ *H04L 45/127* (2013.01); *H04L 45/16* (2013.01); *H04L 45/22* (2013.01)

(58) Field of Classification Search
CPC ....... H04L 45/127; H04L 45/16; H04L 45/22; H04L 45/02; H04L 45/08; H04L 45/306; H04L 9/50
(Continued)

(56) References Cited

U.S. PATENT DOCUMENTS 10,841,372 B1 * 11/2020 Ram ...................... H04L 65/80
2017/0243177 A1 * 8/2017 Johnsrud ................ G06Q 20/10
(Continued)

OTHER PUBLICATIONS

International Search Report and Written Opinion of the International Searching Authority, dated Jul. 7, 2022, from corresponding International Application No. PCT/US2022/073518.

*Primary Examiner* — Aftab N. Khan
(74) *Attorney, Agent, or Firm* — GREENBERG TRAURIG LLP

(57) ABSTRACT

Systems and methods for contextual messaging and information routing in a distributed ledger network are disclosed. According to one embodiment, a method may include a distributed application executed by a sending entity node in a distributed ledger network: receiving a message or communication from a sending entity; identifying a context for the message or communication; retrieving capabilities of other nodes in the distributed ledger network; identifying potential receiving entities for the message or communication based on the capabilities; retrieving routing preferences for the sending entity; applying the routing preferences for the sending entity to identify a receiving entity from the potential receiving entities; and sending the message or communication to a receiving node for the receiving entity using the routing preferences, wherein the receiving node is configured to route the message or communication to the receiving entity using routing preferences for the receiving entity.

17 Claims, 3 Drawing Sheets

(51) Int. Cl.
*H04L 45/12* (2022.01)
*H04L 45/16* (2022.01)
*H04L 45/302* (2022.01)

(58) Field of Classification Search
USPC ........ 709/206–207, 223–225, 227–228, 232, 709/243, 252
See application file for complete search history.

(56) References Cited

U.S. PATENT DOCUMENTS

| | | | |
|---|---|---|---|
| 2018/0189781 A1* | 7/2018 | McCann | G06Q 20/202 |
| 2019/0319964 A1* | 10/2019 | Smith | H04L 69/22 |
| 2021/0158317 A1* | 5/2021 | Kurylko | G06Q 20/34 |
| 2022/0092686 A1* | 3/2022 | Sekar | H04L 9/3239 |
| 2022/0141025 A1* | 5/2022 | Bogineni | H04L 9/3236 |
| | | | 713/156 |
| 2022/0270085 A1* | 8/2022 | Mee | G06Q 20/065 |
| 2024/0007329 A1* | 1/2024 | Doney | G06F 16/2379 |
| 2024/0089130 A1* | 3/2024 | Wang | H04L 9/50 |
| 2024/0107262 A1* | 3/2024 | Gurin | G06F 21/602 |

\* cited by examiner

SYSTEMS AND METHODS FOR CONTEXTUAL MESSAGING AND INFORMATION ROUTING IN A DISTRIBUTED LEDGER NETWORK

RELATED APPLICATIONS

This application claims priority to, and the benefit of, U.S. Provisional Patent Application Ser. No. 63/219,299, filed Jul. 7, 2021, the disclosure of which is hereby incorporated, by reference, in its entirety.

BACKGROUND OF THE INVENTION

1. Field of the Invention

Embodiments relate to contextual messaging and information routing in a distributed ledger network.

2. Description of the Related Art

Distributed ledger platforms, such as the Liink by J. P. Morgan$^{SM}$ platform, provide ecosystems and networks that enable collaboration, access to new capabilities, messaging, and commercialization opportunities for its participants, including financial institutions, corporates and FinTechs.

SUMMARY OF THE INVENTION

Systems and methods for contextual messaging and information routing in a distributed ledger network are disclosed. According to one embodiment, a method for contextual messaging and information routing in a distributed ledger network may include: (1) receiving, at a distributed application executed by a sending entity node in a distributed ledger network, a message or communication from a sending entity; (2) identifying, by the distributed application, a context for the message or communication; (3) retrieving, by the distributed application, capabilities of other nodes in the distributed ledger network; (4) identifying, by the distributed application, potential receiving entities for the message or communication based on the capabilities; (5) retrieving, by the distributed application, routing preferences for the sending entity; (6) applying, by the distributed application, the routing preferences for the sending entity to identify a receiving entity from the potential receiving entities; and (7) sending, by the distributed application, the message or communication to a receiving node for the receiving entity using the routing preferences, wherein the receiving node is configured to route the message or communication to the receiving entity using routing preferences for the receiving entity.

In embodiments, both the context and the capabilities are used to identify the potential receiving entities. The routing preferences may be used to identify one or more receiving entities from the potential receiving entities (e.g., in cases where there is a use case that sends to more than one receiver).

In one embodiment, the context may include a subject and/or an account from the message. The routing preferences for the sending entity may be based on the subject of the message and/or the account in the message.

In one embodiment, the receiving node may be configured to apply routing preferences for the sending entity node to the message.

In one embodiment, the message may be sent to a distributed application at the receiving node.

In one embodiment, the message may be communicated using Transmission Control Protocol (TCP)/Remote Procedure Call (RPC), using a permissioned access route, etc.

According to another embodiment, a system may include a distributed ledger network, and a plurality of nodes in the distributed ledger network, each node executing a distributed application. A sending node distributed application may receive a message or communication from a sending entity, may identify a context for the message or communication, may retrieve capabilities of other nodes in the distributed ledger network, may identify potential receiving entities for the message or communication based on the capabilities, may retrieve routing preferences for the sending entity, may apply the routing preferences for the sending entity to identify a receiving entity from the potential receiving entities, and may send the message or communication to a receiving node for the receiving entity using the routing preferences.

In one embodiment, the context may include a subject and/or an account from the message. The routing preferences for the sending entity may be based on the subject of the message and/or the account in the message.

In one embodiment, the message may be sent to a distributed application at the receiving node.

In one embodiment, the message may be communicated using Transmission Control Protocol (TCP)/Remote Procedure Call (RPC), using a permissioned access route, etc.

According to another embodiment, a non-transitory computer readable storage medium, may include instructions stored thereon, which when read and executed by one or more computer processors, cause the one or more computer processors to perform steps comprising: receiving a message or communication from a sending entity; identifying a context for the message or communication; retrieving capabilities of other nodes in the distributed ledger network; identifying potential receiving entities for the message or communication based on the capabilities; retrieving routing preferences for the sending entity; applying the routing preferences for the sending entity to identify a receiving entity from the potential receiving entities; and sending the message or communication to a receiving node for the receiving entity using the routing preferences.

In one embodiment, the message may be communicated using Transmission Control Protocol (TCP)/Remote Procedure Call (RPC), using a permissioned access route, etc.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Systems and methods for contextual messaging and information routing in a distributed ledger network are disclosed.

A contextual-based messaging system may route messages, communications, etc. from a sender of a message to a receiving entity based on the context of the message or communication, sending entity, or receiving entity preferences, etc. Examples of context include contents of the message, the subject of the message, account number(s) in the message, etc. The routing may be dynamic, in which the routing may vary depending on content, timing, etc.

In one embodiment, a sending entity (e.g., organization, individual, etc.) may specify preferences for routing messages or communications to a receiving entity based on the context. For example, the sending entity may identify the context (e.g., subject, content, account(s), etc.) and may identify a receiving entity for the message or communication.

The routing may be determined at the sending node and/or the receiving node. In one embodiment, the sending node may identify a receiving node from the context, and the receiving node may then apply routing rules, which may be provided by the sender and/or the destination, to further route the message or communication to the receiving entity.

In another embodiment, the receiving node may publish the context capabilities of its destinations either implicitly through Network ID setup or explicitly through self-identification of context capabilities. The sending node may apply rules to identify a destination based on the embodiment context and based on the receiving node context coverage. Routing rules may be provided by the sender based on destination context alignment.

Figure 1:
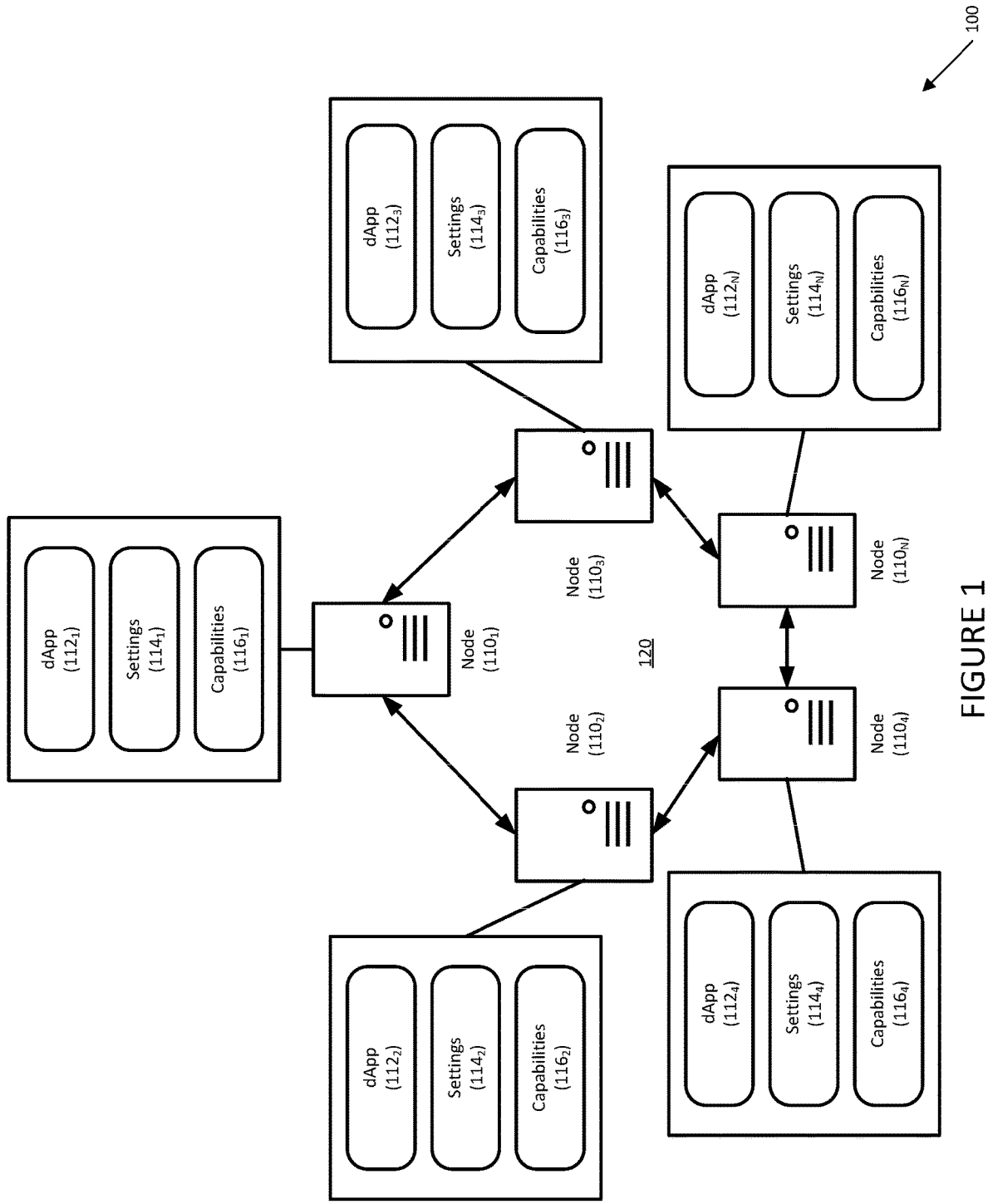
FIG. 1 depicts a system for contextual messaging and information routing in a distributed ledger network according to an embodiment.

Referring to FIG. 1, a system for contextual-based messaging is disclosed according to one embodiment. System 100 may include distributed ledger network 120 that may include a plurality of nodes 110 (e.g., node $110_1$, node $110_2$, node $110_3$, node $110_4$, . . . node $110_N$). Each node 110 may include distributed application ("dApp") 112 (e.g., dapp $112_1$, dapp $112_2$, dapp $112_3$, dapp $112_4$, . . . dapp $112_N$), settings module 114 (e.g., settings module $114_1$, settings module $114_2$, settings module $114_3$, settings module $114_4$, . . . settings module $114_N$), and capabilities module 116 (e.g., capabilities module $116_1$, capabilities module $116_2$, capabilities module $116_3$, capabilities module $116_4$, . . . capabilities module $116_N$).

dApps 112 may receive a message from a user of the respective node 110 and may route it to a destination node (e.g., from node $110_1$ to node $110_2$). dApps 112 may route the message based on the context of the message, such as the e.g., subject, content, account(s), etc.). In one embodiment, dApps 112 may apply user preferences in settings modules 114 to route the message.

Capabilities modules 116 may store capabilities of its node 110. The capabilities may be based on, for example, systems supported by the nodes (e.g., payment systems, processing systems, etc.). The systems supported may be relative to a product, such as a transaction type. In one embodiment, an entity at a node 110 may self-report its capabilities; in another embodiment, a node 110 may learn an entity's capabilities.

dApps 112 may route outgoing messages (e.g., messages being sent from a first node $110_1$ to a second node $110_2$) and/or incoming messages (e.g., messages being received at first node $110_1$ from second node $110_2$) according to capabilities of nodes 110 in capabilities modules 116 and receiving settings modules 114. In one embodiment, dApps 112 may retrieve the capabilities from capabilities modules 116 in the other nodes 110 to identify nodes 110 that can receive the outgoing messages.

In embodiments, messages between nodes 110 may be permissioned, meaning that users of nodes 110 may only see information that they have permission to view. This may include queries for which users of nodes 110 are a party. Data on distributed ledger network 120 may also be encrypted.

Each user may determine which network participants (e.g., other nodes 110 or users of nodes 110) to engage on distributed ledger network 120. Encrypted information may only be shared over distributed ledger network 120 between the requesting user and the receiving user. In one embodiment, a transaction hash with no public information may be stored to the permissioned distributed ledger network 120, and available to all users.

In embodiments, both the context and the capabilities are used to identify the potential receiving entities. The routing preferences may be used to identify one or more receiving entities from the potential receiving entities (e.g., in cases where there is a use case that sends to more than one receiver).

Examples of controls may include some or all of the following: data requests may be systemically routed to data owner; data may be encrypted in route and at rest; separate private and permissioned databases may be provided; permissioned nodes may restrict information requester is allowed to see; personal information data may be held on private databases with only hashed values shared on the distributed ledger; and data requests may be securely authenticated.

In embodiments, each participant infrastructure may be configured and deployed in its own Virtual Local Area Network (VLAN) setup with Production and Disaster Recovery instances of Web, App, DB Virtual Machines (VMs) physically residing on two separate hyper converge managed appliances. Inter-node connectivity between the participants in the network may be via Transmission Control Protocol (TCP)/Remote Procedure Call (RPC), over specific, secure IP's and ports configured and controlled via a permissioned access routes on the Firewall between VLANs. Transactions may be committed to only the Production node of the participant setup and a separate replication process ensures node pair replication to aid in resiliency/recovery when there is a failover. Each participant institution network IP's may be on an approved list to allow access to the application. End User Access to the network participant web interface may be via Secure Web Services (HTTPS).

Figure 2:
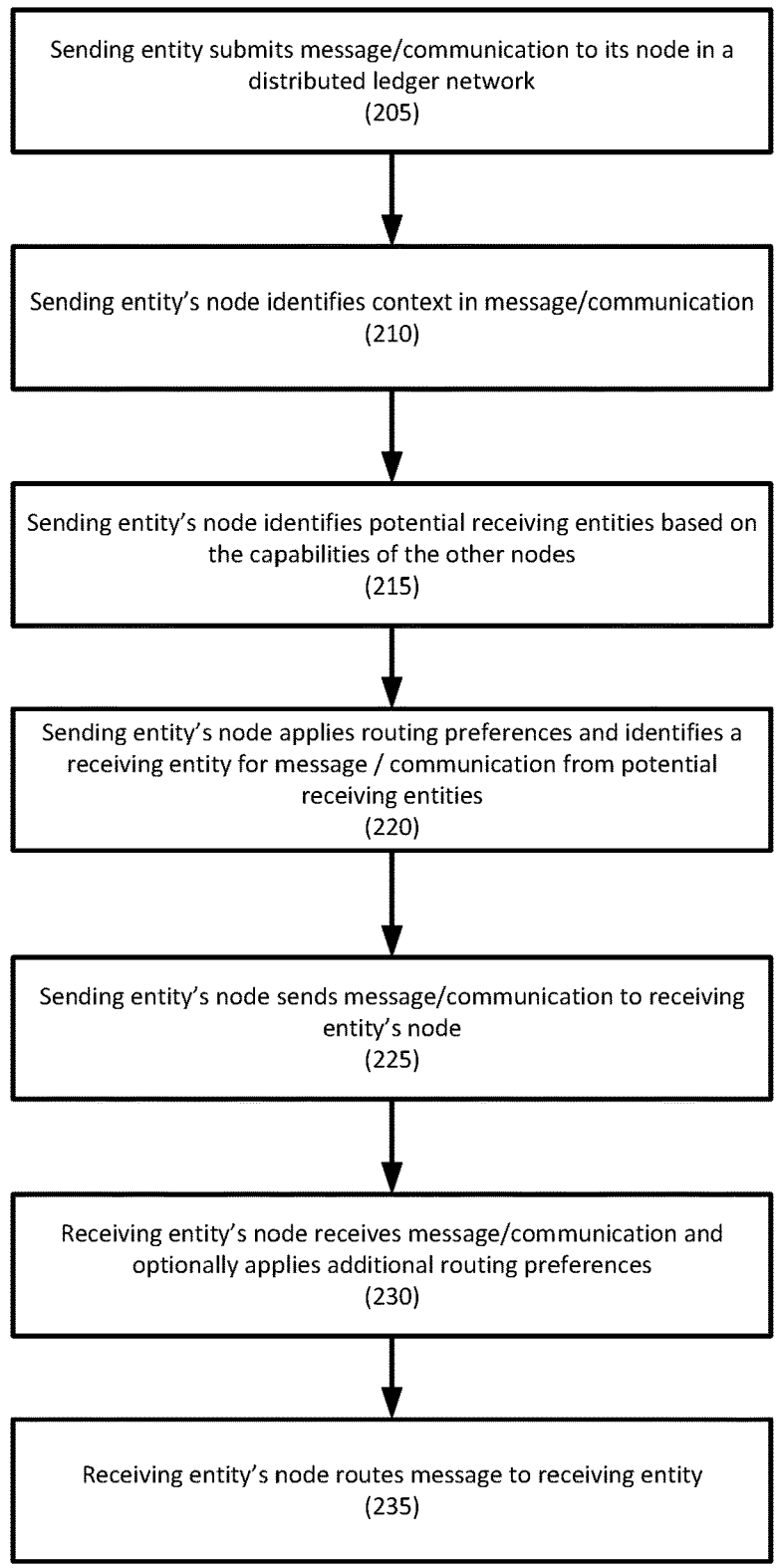
FIG. 2 depicts a method for contextual messaging and information routing in a distributed ledger network according to an embodiment.

Referring to FIG. 2, a method for contextual-based messaging is disclosed according to one embodiment. In step 205, a sending entity may submit a message or communication to its node in a distributed ledger network. In one embodiment, a distributed application, or "dApp," may receive the message submission from the sending entity.

In one embodiment, the sending entity may be in communication with its node, or may participate as a node in the distributed ledger network. In step 210, the dApp at the sending entity's node may identify the context (e.g., subject, content, account(s), etc.) from the message or communication.

In step 215, the dApp at the sending entity's node may identify potential receiving entities based on the capabilities of the other nodes. For example, the dApp at the sending entity's node may retrieve the capabilities of the other nodes and may identify receiving entities that are capable of processing the message or communication.

In step 220, the dApp at the sending entity's node may retrieve and apply sending entity's routing preferences, and may identify a receiving entity for the message or communication from the potential receiving entities. In one embodiment, the sending entity (e.g., organization, individual, etc.) may specify preferences for routing messages or communications to a receiving entity based on the context in the settings. For example, the sending entity may identify the context (e.g., subject, content, account(s), etc.) and may identify a receiving entity for the message or communication.

In embodiments, both the context and the capabilities are used to identify the potential receiving entities. The routing preferences may be used to identify one or more receiving entities from the potential receiving entities (e.g., in cases where there is a use case that sends to more than one receiver).

In one embodiment, the routing may be determined as the sending node and/or the receiving node. For example, the sending node may identify a receiving node from the context, and the receiving node may then apply routing rules, which may be provided by the sender and/or the destination, to further route the message or communication to the receiving entity.

In one embodiment, the dApp may identify a receiving entity node associated with the receiving entity, and may route the message or communication to the receiving entity node. A dApp at the receiving entity node may then apply the receiving entity's preferences to route the message or communication to the receiving entity.

In step 225, the dApp at the sending entity node may send the communication or message to the receiving entity node.

In step 230, the receiving entity node may receive the communication or message, and may optionally apply additional routing preferences to further route the communication or message as desired.

In step 235, the receiving entity node may route the message or communication to the receiving entity.

Figure 3:
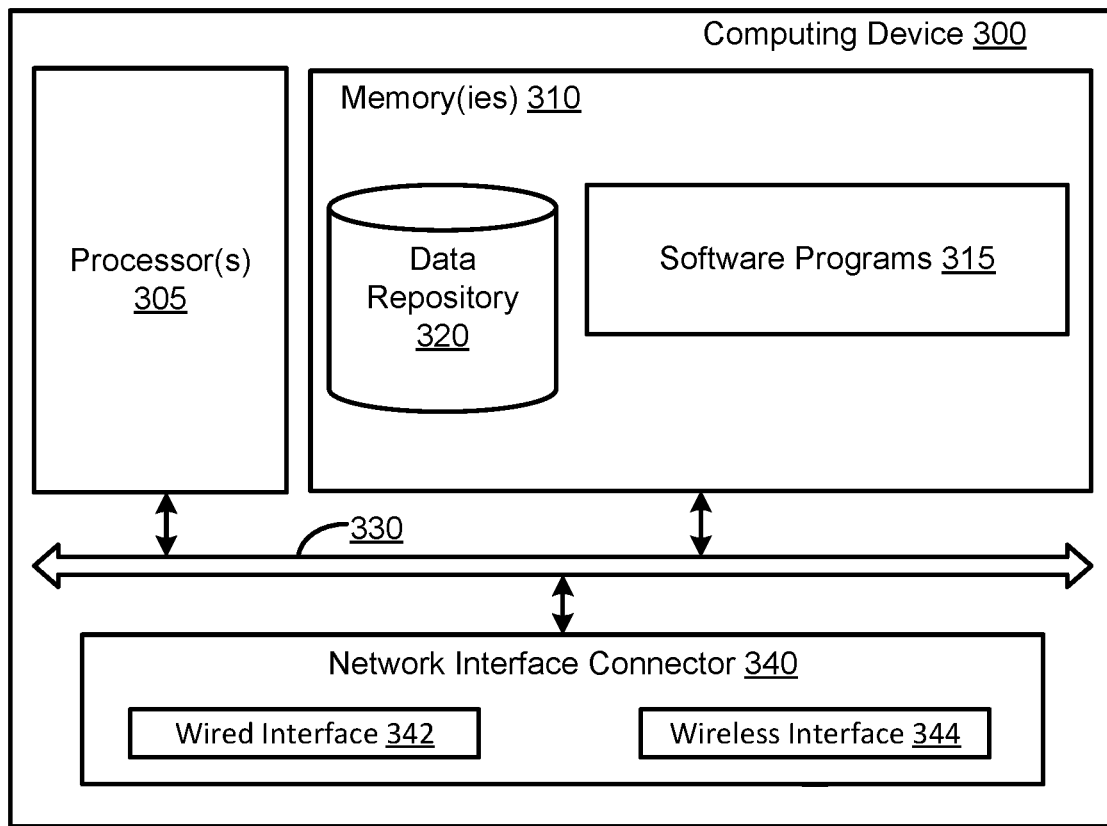
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Additional details may be found in the attached Appendix, the disclosure of which is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for contextual messaging and information routing in a distributed ledger network, comprising:
   receiving, at a distributed application executed by a sending entity node in a distributed ledger network, a message or communication from a sending entity;
   identifying, by the distributed application, a context for the message or communication;
   retrieving, by the distributed application, and from each of the other nodes in the distributed ledger network, an identification of payment systems supported by the other nodes in the distributed ledger network;
   identifying, by the distributed application, potential receiving entities for the message or communication based on the context and the identification of the payment systems supported by the other nodes;
   retrieving, by the distributed application, routing preferences for the sending entity;
   applying, by the distributed application, the routing preferences for the sending entity to identify a receiving entity from the potential receiving entities; and
   sending, by the distributed application, the message or communication to a receiving node for the receiving entity using the routing preferences, wherein the message is sent using Transmission Control Protocol (TCP)/Remote Procedure Call (RPC).

2. The method of claim 1, wherein the receiving node is configured to apply routing preferences for the sending entity node to the message.

3. The method of claim 1, wherein the message is sent to a distributed application at the receiving node.

4. The method of claim 1, wherein the message is communicated using a permissioned access route.

5. The method of claim 1, wherein the receiving node is configured to route the message or communication to the receiving entity using routing preferences for the receiving entity.

6. The method of claim 1, wherein the context comprises a subject and/or an account from the message.

7. The method of claim 6, wherein the routing preferences for the sending entity are based on the subject of the message.

8. The method of claim 6, wherein the routing preferences are based on the account in the message.

9. A system, comprising:
   a distributed ledger network; and a plurality of nodes in the distributed ledger network, each node executing a distributed application;
   wherein: a sending node distributed application receives a message or communication from a sending entity;
   the sending node distributed application identifies a context for the message or communication;
   the sending node distributed application retrieves, from each of the other nodes in the distributed ledger network, an identification of payment systems supported by the other nodes in the distributed ledger network;
   the sending node distributed application identifies potential receiving entities for the message or communication based on the context and the identification of the payment systems supported by the other nodes;
   the sending node distributed application retrieves routing preferences for the sending entity;
   the sending node distributed application applies the routing preferences for the sending entity to identify a receiving entity from the potential receiving entities; and
   the sending node distributed application sends the message or communication to a receiving node for the receiving entity using the routing preferences, wherein the message is sent using Transmission Control Protocol (TCP)/Remote Procedure Call (RPC).

10. The system of claim 9, wherein the message is sent to a distributed application at the receiving node.

11. The system of claim 9, wherein the message is communicated using a permissioned access route.

12. The system of claim 9, wherein the receiving node is configured to route the message or communication to the receiving entity using routing preferences for the receiving entity.

13. The system of claim 9, wherein the context comprises a subject and/or an account from the message.

14. The system of claim 13, wherein the routing preferences for the sending entity are based on the subject of the message.

15. The system of claim 13, wherein the routing preferences for the sending entity are based on the account in the message.

16. A non-transitory computer readable storage medium, including instructions stored thereon, which when read and executed by one or more computer processors, cause the one or more computer processors to perform steps comprising:
   receiving a message or communication from a sending entity;
   identifying a context for the message or communication;
   retrieving from each of the other nodes in a distributed ledger network an identification of payment systems supported by the other nodes in a distributed ledger network;
   identifying potential receiving entities for the message or communication based on the context and the identification of the payment systems supported by the other nodes;
   retrieving routing preferences for the sending entity;
   applying the routing preferences for the sending entity to identify a receiving entity from the potential receiving entities; and
   sending the message or communication to a receiving node for the receiving entity using the routing preferences, wherein the message is sent using Transmission Control Protocol (TCP)/Remote Procedure Call (RPC).

17. The non-transitory computer readable storage medium of claim 16, wherein the message is communicated using a permissioned access route.

* * * * *